United States Patent [19]
Kress

[11] Patent Number: 4,517,207
[45] Date of Patent: May 14, 1985

[54] METHOD FOR PROCESSING AN AVIAN CARCASS

[75] Inventor: Jack L. Kress, Wilton, Iowa

[73] Assignee: Oscar Mayer Foods Corporation, Madison, Wis.

[21] Appl. No.: 468,535

[22] Filed: Feb. 22, 1983

[51] Int. Cl.³ .................... A22C 21/00; A23B 4/00; A23L 1/315
[52] U.S. Cl. .................... 426/315; 17/45; 426/332; 426/480; 426/644
[58] Field of Search ............ 426/315, 332, 644, 472, 426/473, 480, 523, 524, 641; 17/45, 46, 52, 1 G, 11

[56] References Cited

U.S. PATENT DOCUMENTS

| | | | |
|---|---|---|---|
| 1,980,904 | 11/1934 | Botz | 17/45 X |
| 2,381,044 | 8/1945 | Franz | 17/45 |
| 2,830,319 | 4/1958 | Muntz | 17/46 |
| 2,922,718 | 1/1960 | Saverslak | 426/644 X |
| 3,057,006 | 10/1962 | Cutrera | 17/46 |
| 3,347,680 | 10/1967 | Rambold | 17/46 |
| 3,570,050 | 3/1971 | Draper et al. | 17/46 |
| 3,595,682 | 7/1971 | Lind et al. | 426/315 |
| 3,623,892 | 11/1971 | Koonz et al. | 426/480 X |
| 3,778,867 | 12/1973 | Sindler et al. | 17/11 |
| 3,927,440 | 12/1975 | Sindler et al. | 17/52 |

Primary Examiner—Arthur L. Corbin
Attorney, Agent, or Firm—J. T. Harcarik; T. R. Savoie; D. J. Donovan

[57] ABSTRACT

A method for processing an advancing avian carcass wherein muscle parts are removed from an advancing warm carcass prior to rigor mortis, the advancing carcass is eviscerated and the removed parts are preserved within two hours of removal.

19 Claims, 3 Drawing Figures

METHOD FOR PROCESSING AN AVIAN CARCASS

CROSS REFERENCE TO RELATION APPLICATION

This application is related to co-pending application, Ser. No. 468,536, entitled "Process for Eviscerating An Avian Carcass" by Jack L. Kress filed concurrently with this application and herein incorporated by reference.

BACKGROUND OF THE INVENTION

1. Field of the Invention

This invention pertains to a method for processing an advancing avian carcass and more particularly to a method for processing an advancing avian carcass wherein a muscle part is removed from the advancing warm carcass and preserving of the removed part is initiated within two hours after removal.

2. Prior Art

Present avian processing methods and particularly turkey processing involves the steps of killing, bleeding, defeathering, eviscerating, trimming, washing, chilling, segmenting, boning, processing and packaging.

Eviscerating involves the process of removing the inedible entrails and parts of the turkey. The above defined process from killing to segmentation and boning takes from 2 to 36 hours. At the time of boning, the turkey carcasses are in various phases of rigor.

The boning of the carcass past the prerigor phase is difficult and can cause a reduction in yield. Boning and segmenting meat in a rigor phase can result in muscle toughening when frozen and subsequently cooked. Processing of prerigor or early rigor boned and segmented turkey meat will result in decreased moisture retention and yield loss in cooked product.

Furthermore, according to the presently used system, the whole avian carcass is chilled prior to boning. This results in costly energy loss since not all the chilled parts may ultimately be usable and the process is labor-intensive.

It is thus desired to have a process for segmenting and boning avians and particularly turkeys which produces a product that is more tender and retains more natural juices during cooking and which is less costly and time-consuming than currently employed methods.

SUMMARY OF THE INVENTION

This invention pertains to a method for processing an advancing avian carcass wherein the advancing carcass is eviscerated for inspection and muscle parts removed prior to further processing. The muscle parts are then preserved within two hours from removal.

It has been found when this method is employed a more tender and juicy product may be obtained and processing the avian carcass is less costly and time consuming than current methods.

DESCRIPTION OF PREFERRED EMBODIMENTS

After an avian has been bled and defeathered its head and feet are usually removed by mechanical means. The avian carcass is then put on a continuous line for further processing. This is done by conventional means well known to the art such as hanging the avian carcass by its neck, hocks or other suitable parts on an advancing conveyor, so that the avian carcass advances from station to station for further processing. Suitably, the avian carcass advances at a rate of at least ten carcasses per minute per line, preferably at a rate of at least thirty carcasses per minute per line, and more preferably at a rate of at least one hundred carcasses per minute per line. Suitably the avian carcass is a turkey carcass or a chicken carcass and preferably the avian carcass is a turkey carcass.

Figure 1:
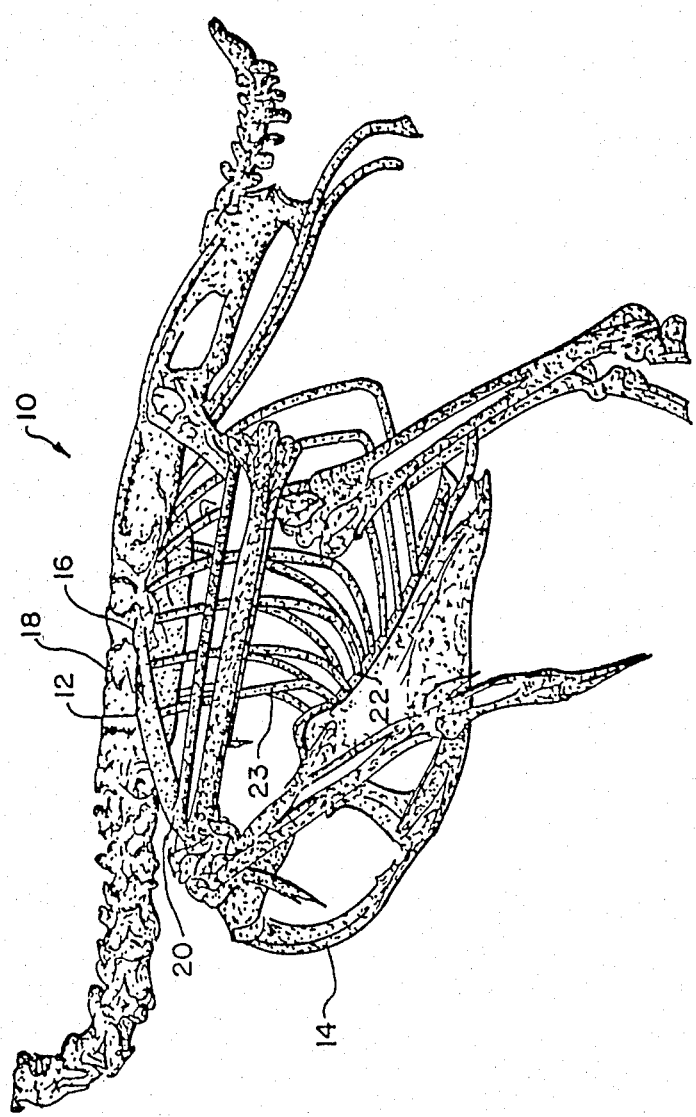
FIG. 1 is a schematic skeletal view of an avian illustrating the mid section.

At one station the advancing avian carcass must be eviscerated for inspection. Conventional means may be employed such as making an incision around the anus of the carcass and pulling the viscera through the incision. Another means of evisceration is the procedure described in the above mentioned co-pending application. This procedure is illustrated by referring to FIG. 1. A mid skeletal section 10 of an avian is shown. An avian contains two scapula bones and two coracoid bones. A scapula 12 and a coracoid 14 is shown in FIG. 1. Scapula 12 is connected to a vertebral column 16 at articulation 18 by means of shoulder muscle (trapezius, rhomboideus, serratus and latissimus dorsi) and is also connected to coracoid 14 at articulation 20.

According to this method, scapula 12, articulation 18 or articulation 20 is severed. Scapula 12 may be severed by manual means or by mechanical means such as cutting, sawing, or crushing. Articulations 18 or 20 may also be severed by manual or mechanical means such as pulling, cutting or sawing. After scapula 12 or its articulation 18 or 20 has been severed coracoid 14 is separated from the vertebral column 16. This allows the avian carcass to separate along sternoscal articulations 22 of rib 23 so that the inside of the avian carcass is exposed and the entrails are visible for easy inspection.

Figure 2:
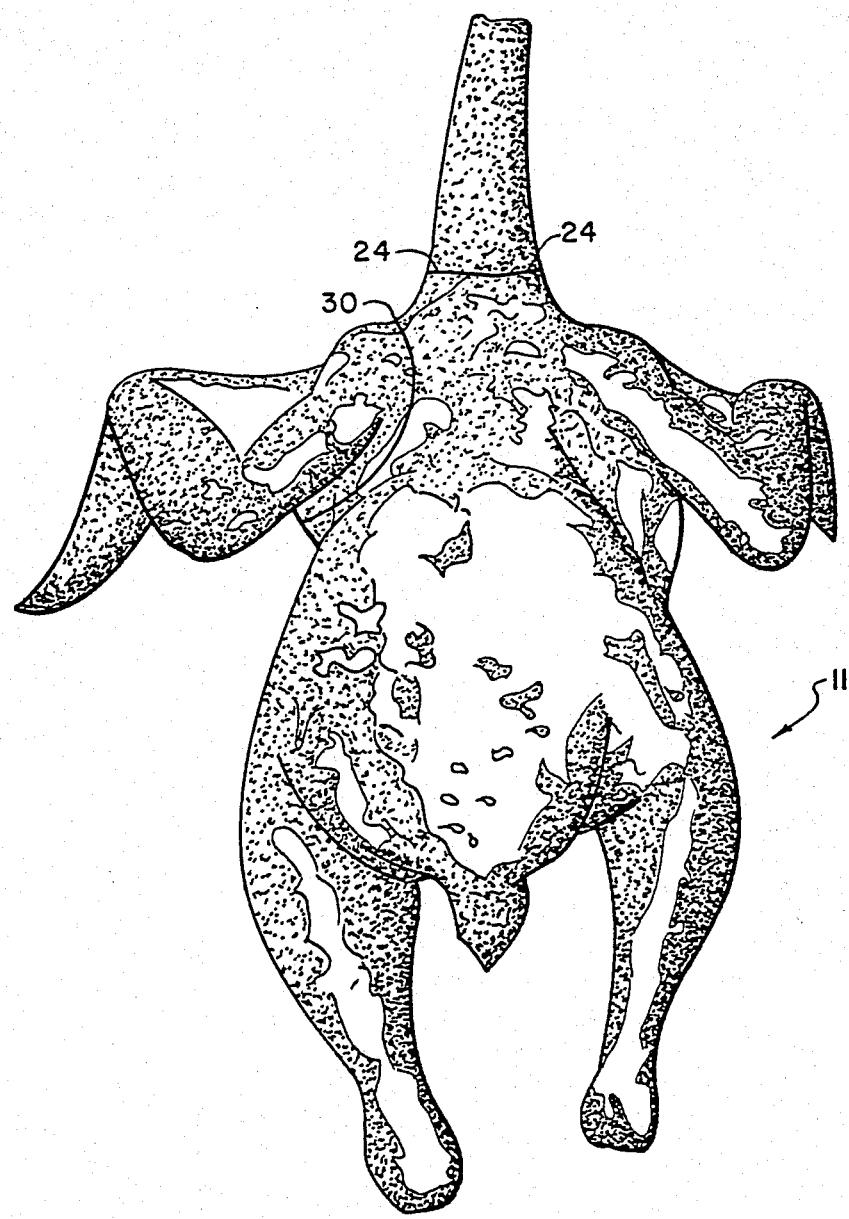
FIG. 2 is a schematic dorsal view of an avian carcass.
Figure 3:
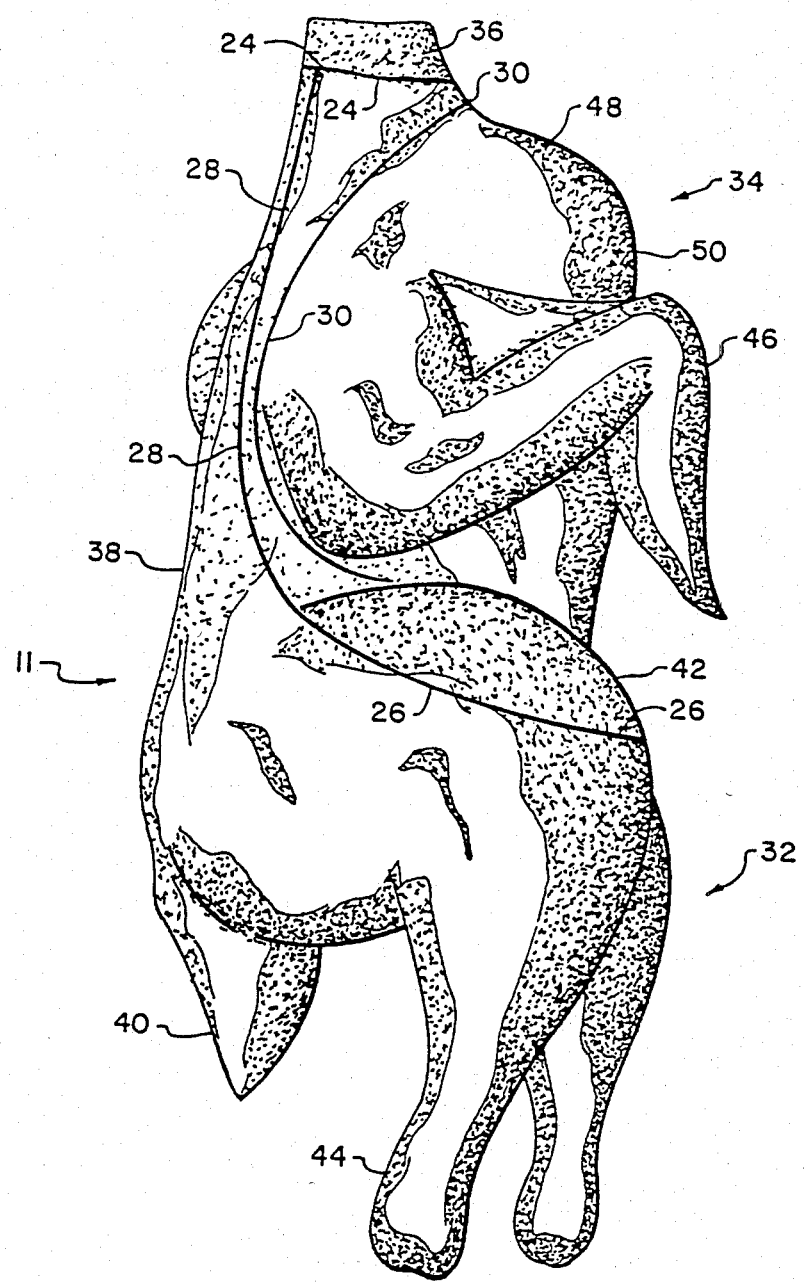
FIG. 3 is a schematic sideview of an avian carcass.

Prior to separating coracoid 14 from vertebral column 16 the skin of the carcass must be removed or scored to allow separation of the sternocostal articulations. As shown in FIG. 2 and 3 the skin of avian carcass 11 is suitably scored by first making a dorsel cervical cut 24. Next the skin is scored begining from a caudal section 26 then diagonally along line 28 to the dorsal cervical cut 24.

According to the present invention, muscle parts are removed from the advancing avian carcass prior to rigor mortis. Suitably this is done within 30 minutes of death. Suitable parts are neck 36, back 38, tail 40, thighs 26, leg 44, wings 46, shoulder girdle 48 and breast 50 as shown in FIGS. 2 and 3.

After removal the preserving of the removed parts must be initiated within two hours of removal and preferably within one hour of removal. Preserving should be completed within twenty-four hours after removal. Suitable preserving means include cooking, chilling to below 40° F., freezing to below 25° F., smoking, drying and preserving by the addition of chemical preservatives.

The parts may also be packaged using conventional packing means such as thin transparent polymers surrounding the part seated in a semi-rigid polymeric base.

Not only does the present invention conserve time and energy since the whole carcass does not have to be frozen or chilled, but it offers great flexibility in processing. For example, removed parts may be warm boned, cooked, then packaged; may be warm boned then frozen; may be chilled and packaged; or may be packaged and frozen.

This invention may be employed for the manufacture of ready-to-eat processed products which involves the steps of mixing or blending boneless turkey meat with salt and other ingredients to extract the salt soluble protein in the muscle. Upon heating, the salt soluble protein will coagulate causing the boneless muscle pieces to bind together to form a solid unitary mass. Also, coagulation of the salt soluble proteins will reduce moisture loss and drying during heating.

It has been found that using hot boned boneless meat in processed turkey products enables a significant increase in the amount of salt soluble protein which is extracted from the meat during blending. This results in a finished product in which the meat pieces are more firmly bound together and upon slicing won't fall apart. Also, more of the natural meat juices are trapped in the product which results in a more moist product with higher yield.

Likewise, it has been found that boning of pre-rigor meat is easier since the muscle has a tendency to tear away from the bone.

Further avian anatomy is described by Nickel, R., A. Dchummer, E. Seiferle and W. G. Siller, P. A. L. Wight, *Anatomy of the Domestic Birds*, Springer-Verlog, New York, Heidelburg, Berlin, (1977).

The following examples are presented to further illustrate the invention but is to be understood that the invention is not to be limited to the details described therein.

EXAMPLE 1

In this example, a defeathered and bled turkey carcass with its head and feet removed is hung by its hocks on an advancing conveyor with its dorsal side toward an operator. As the carcass advances, the following operations are performed.

A longitudinal cut is made through the skin along the dorsum of the neck. The skin is separated around the neck. Cervical viscera (trachea, esophagus, crop) are removed by traction.

The joint between the autopodium (distal wing) and zeugopodium (middle wing) on both sides is partially cut leaving the anterior edge intact so the former can be folded over the latter.

Wings are removed by cutting through connecting muscles and shoulder joint without entering the pectoral (breast) muscles and the preen gland is removed.

Coccygeal (tail) vertebrae is separated by a ventral to dorsal cut which allows the tail to be disarticulated. The tail remains attached to the carcass by the remaining unsevered coccygeal muscles and the dorso-lateral skin.

Skin is scored on both sides of the carcass by cutting diagonally from the base of the tail, across the proximal thigh and lateral body wall to connect with the most caudal area where the wings have been removed.

The tail is gripped and pulled anteriorly to the neck removing the dorsal skin and exposing the deeper tissues of the carcass' dorsum.

The tail is removed by cutting through the dorsal skin and the dorsal skin is dissected free of the carcass. (Alternatively, this may be accomplished by removing the tail and dorsal skin as one piece and then separating the tail and skin).

The carcass is inverted and hung by the neck with the ventral side presented to the operator.

The skin over the thighs is elevated by traction and cut along the anterior border of the thighs extending the cuts between the thighs and abdominal wall. The skin is removed from the thighs and legs by a combination of traction and dissection in such a manner that it is everted and peeled down to each hock. It is cut off so that only 3-4 cm remains covering the hocks.

Muscles on the proximal medial thighs (e.g. gracilis m., semitendinosus m.) are severed and the coxofemoral (hip) joints disarticulated by reflecting the legs dorso-laterally.

Gluteal muscles are cut free from their origins on the synsacrum. Musculature of the thighs and legs are separated from origins and insertions along the femur and tibiotarsal bones by cutting along the medial surfaces initially and extending cuts around the bones in all directions. The bones are removed leaving the entire deboned musculature of the thighs and legs attached to the carcass.

Muscles of the legs are removed by cutting through the area previously occupied by the femeropatellartibial (knee) joints.

Muscles of the thighs are removed from the carcass by dissection of muscle origins along the synsacrum while gentle traction is being applied to the muscle mass.

Muscles dorsal and lateral to the scapulas are removed by cutting.

Pectoral muscles anterior to the shoulders are separated from the coracoids and furcula by cutting along these bones. Their origins are partially freed by cutting along the sternum until they remain attached only along the ventral sternal keel. The entire pectoral muscle mass from both sides, still covered with skin, is then removed by cutting along the ventral sternal keel while keeping gentle traction on the muscle mass.

Furcula is removed intact by cutting beneath it from ventral to dorsal and manually reflecting it dorsally to disarticulate it from the shoulder joint.

Scapulas are separated from the carcass by cutting between it and the carcass using the belly of the knife blade to cut from the caudal end in a ventro-lateral direction.

Outward and downward traction is placed on the coracoids causing separation of the shoulder girdle and ribs along the sternocostal articulations. This exposes the underlying viscera clearly presenting the heart, liver, intestines and related minor viscera for view. Remainig bones of the shoulder girdle, ribs and sternum are removed by a small cut between the caudal sternum and abdominal wall.

Viscera are grasped, pulled outward and downward and left hanging from the carcass exposing the remaining organs in the carcass.

Viscera are removed by cutting around the cloaca and vent in such a way that visera hanging from the carcass are freed from the carcass.

Neck is separated from the carcass by cutting through the caudal cervical musculature and gently twisting the carcass until separation occurs.

EXAMPLE 2

In this example the muscle parts are removed from an advancing carcass as described in Example 1. The removed muscle parts are then chilled in iced water. The parts are then packaged in polymeric bags.

EXAMPLE 3

In this example the legs and thighs are removed from an advancing carcass as described in Example 1. Prior to rigor mortis the legs and thigh are boned by an operator employing a knife. The boned meat is shortly thereafter frozen.

EXAMPLE 4

In this example, a defeathered and bled turkey carcass with its head and feet removed is hung by its hocks on an advancing conveyor with its dorsal side toward an operator. As the carcass advanced, the following operations are performed.

A longitudinal cut is made through the skin along the dorsum of the neck. The skin is separated around the neck. Cervical viscera (trachea, esophagus, crop) are removed by traction.

The skin is scored diagonally from the knee joint to the shoulder joint connecting with the above described dorsal cervical cut.

The carcass is hung by the neck with the dorsal side of the carcass presented to the operator.

The shoulder muscles between the scapula and carcass are cut by an incision beginning anterior and dorsal to the carcass and extending the cut around the shoulder joint caudally and ventrally.

Carcass is turned so ventral side is presented to the operator. The scapulas are grasped and pulled forward and downward causing separation of the shoulder girdles and ribs.

This results in excellent exposure of the viscera and separation of the carcass into two main pieces: one composed of the neck, back, tail, thighs, legs and viscera; and the other composed of wings, shoulder girdle, and breast.

The two pieces are separated by cutting through the abdominal wall.

Viscera are removed as described in Example 1.

The pieces comprised of wings, shoulder girdle and breast is frozen shortly after removal.

The pieces comprised of neck, back, tail, thighs and legs is boned prior to chilling and the meat is then chilled.

What is claimed:

1. A method for processing an advancing avian carcass which comprises:
   (a) removing warm muscle parts from an advancing avian carcass prior to rigor mortis on a continuous line wherein the avian carcass advances at a rate of at least ten carcasses per minute per line;
   (b) eviscerating the advancing avian carcass by severing both of its scapula or their articulation, and separating the coracoids associated with the severed scapulas or their articulation from the vertebral column so that the entrails are exposed for inspection and wherein the evisceration occurs after warm parts have been removed from the advancing avian carcass; and
   (c) initiating preservation of the removed warm muscle parts within two hours of removal.

2. A method according to claim 1 wherein the avian is selected from the group consisting of turkey and chicken.

3. A method according to claim 2 wherein the avian is turkey.

4. A method according to claim 1 wherein the warm muscle parts are preserved by chilling 5. A method according to claim 1 wherein the warm muscle parts are preserved by cooking.

6. A method according to claim 1 wherein the warm muscle parts are preserved by smoking.

7. A method according to claim 1 wherein the warm muscle parts are preserved by drying.

8. A method according to claim 1 wherein the warm muscle parts are preserved by the addition of chemical preservatives.

9. A method according to claim 1 wherein the muscle parts are wings.

10. A method according to claim 1 wherein the muscle parts are breasts.

11. A method according to claim 1 wherein the muscle parts are shoulders.

12. A method according to claim 1 wherein the muscle part is a back.

13. A method according to claim 1 wherein the muscle parts are thighs.

14. A method according to claim 1 wherein the muscle parts are legs.

15. A method according to claim 1 wherein the muscle part is a tail.

16. A method according to claim 1 wherein the removed parts are preserved within one hour of removal.

17. A method according to claim 1 wherein separating the coracoid from the vertebral column causes separation of sternocostal articulations.

18. A method according to claim 1 wherein the skin of the avian carcass is removed prior to separating the coracoid from the vertebral column.

19. A method according to claim 1 wherein the skin of the avian carcass is scored prior to separating the coracoid from vertebral column wherein the scoring allows the sternocostal articulations to separate.

* * * * *